United States Patent
Matsuo et al.

(10) Patent No.: US 9,922,259 B2
(45) Date of Patent: Mar. 20, 2018

(54) TRAFFIC LIGHT DETECTION DEVICE AND TRAFFIC LIGHT DETECTION METHOD

(71) Applicant: Nissan Motor Co., Ltd., Yokohama-Shi, Kanagawa (JP)

(72) Inventors: Haruo Matsuo, Kanagawa (JP); Daiki Yamanoi, Kanagawa (JP); Takahiko Oki, Kanagawa (JP)

(73) Assignee: Nissan Motor Co., Ltd., Yokohama-shi, Kanagawa (JP)

(*) Notice: Subject to any disclaimer, the term of this patent is extended or adjusted under 35 U.S.C. 154(b) by 0 days.

(21) Appl. No.: 15/324,519

(22) PCT Filed: Jul. 8, 2014

(86) PCT No.: PCT/JP2014/068105
§ 371 (c)(1),
(2) Date: Jan. 6, 2017

(87) PCT Pub. No.: WO2016/006029
PCT Pub. Date: Jan. 14, 2016

(65) Prior Publication Data
US 2018/0012088 A1    Jan. 11, 2018

(51) Int. Cl.
*G06K 9/00* (2006.01)
*G01C 21/26* (2006.01)
(Continued)

(52) U.S. Cl.
CPC ......... *G06K 9/00825* (2013.01); *G01C 21/26* (2013.01); *G06K 9/00805* (2013.01);
(Continued)

(58) Field of Classification Search
CPC .................................. G06K 9/00; G08G 1/00
(Continued)

(56) References Cited

U.S. PATENT DOCUMENTS 8,576,069 B2 * 11/2013 Nadeem .................. B60H 3/00
340/539.25
2010/0033571 A1 * 2/2010 Fujita .................... B60W 40/02
348/149

FOREIGN PATENT DOCUMENTS

CN    103680176 A    3/2014
JP    2007178223 A    7/2007
(Continued)

OTHER PUBLICATIONS

Lindner, F., et al., Robust Recognition of Traffic Signals, Intellegent Vehicles Symposium, 2004, pp. 49-53, IEEE, Parma, Italy.
(Continued)

*Primary Examiner* — Abolfazl Tabatabai
(74) *Attorney, Agent, or Firm* — Young Basile Hanlon & MacFarlane, P.C.

(57) ABSTRACT

A traffic light detection device includes: an image capture unit capturing an image of surroundings; a traffic light location estimation unit estimating a location of a traffic light around the vehicle and setting a traffic light search area in which the traffic light is estimated to be present; a traffic light detection unit detecting the traffic light by searching the traffic light search area on the image; and an obstruction estimation unit. When the obstruction estimation unit estimates that a continuous obstruction state where a view of the traffic light is continuously obstructed occurs in the traffic light search area, the traffic light location estimation unit selects the traffic light search area based on the continuous obstruction state.

7 Claims, 15 Drawing Sheets

(51) Int. Cl.
 G08G 1/095 (2006.01)
 B60W 30/18 (2012.01)
 G05D 1/02 (2006.01)

(52) U.S. Cl.
 CPC ............... *B60W 30/18154* (2013.01); *B60Y 2400/3015* (2013.01); *G05D 1/0231* (2013.01)

(58) Field of Classification Search
 USPC ............ 382/103, 104; 348/149; 701/117; 340/906, 907, 910, 932, 995.13
 See application file for complete search history.

(56) References Cited

FOREIGN PATENT DOCUMENTS

| | | | |
|---|---|---|---|
| JP | 2007257299 | A | 10/2007 |
| JP | 2007320458 | A | 12/2007 |
| JP | 2008149786 | A | 7/2008 |
| JP | 2008293277 | A | 12/2008 |
| JP | 2013171489 | A | 9/2013 |
| WO | 2008038370 | A1 | 4/2008 |

OTHER PUBLICATIONS

Possegger et al., "Occlusion Geodesics for Online Multi-Object Tracking", pp. 1306-1313, Jun. 23, 2014.
Fairfield et al., "Traffic Light Mapping and Detection", pp. 5421-5426, May 9, 2011.
Lavalle S M et al., "Motion Strategies for Maintaining Visibility of a Moving Target", pp. 731-736, Apr. 20, 1997.

\* cited by examiner

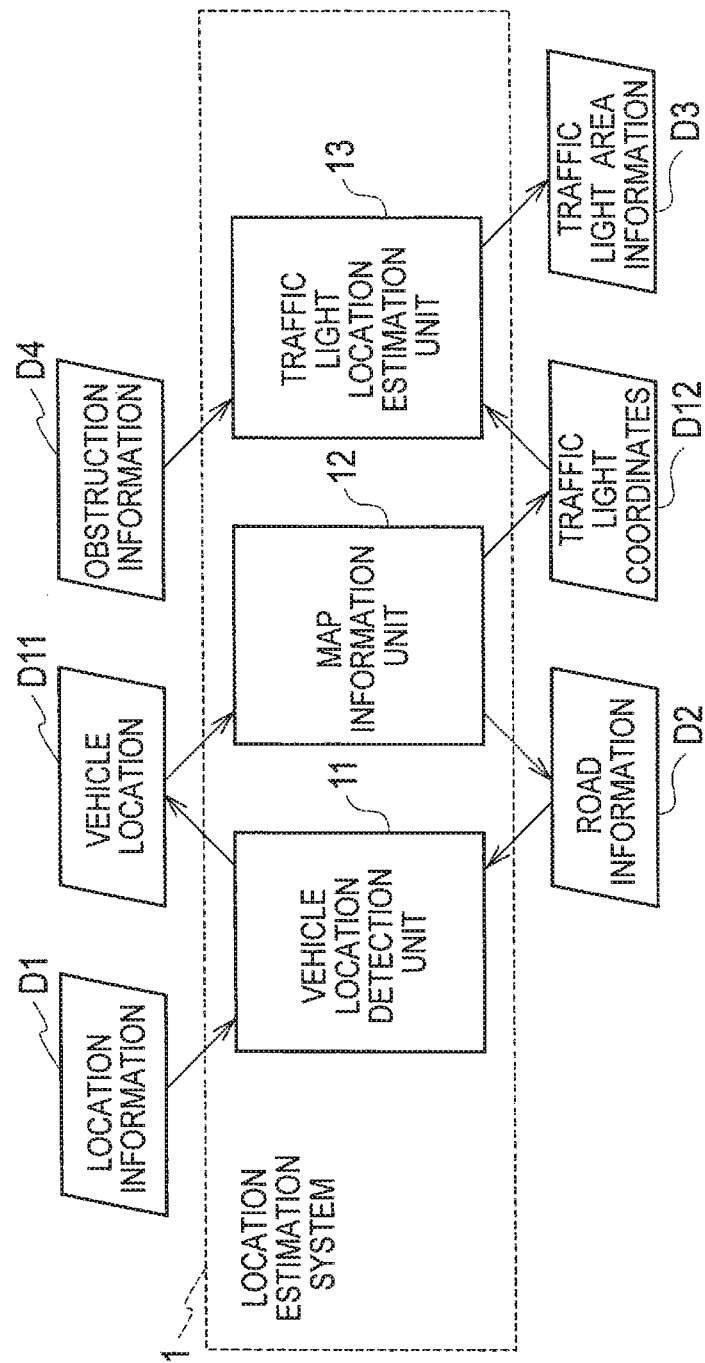

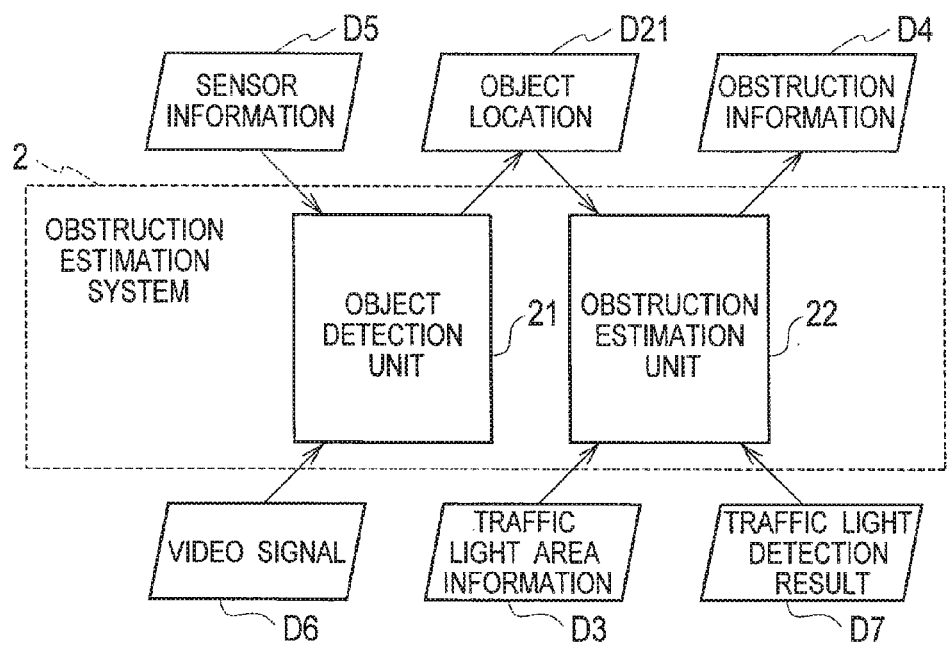
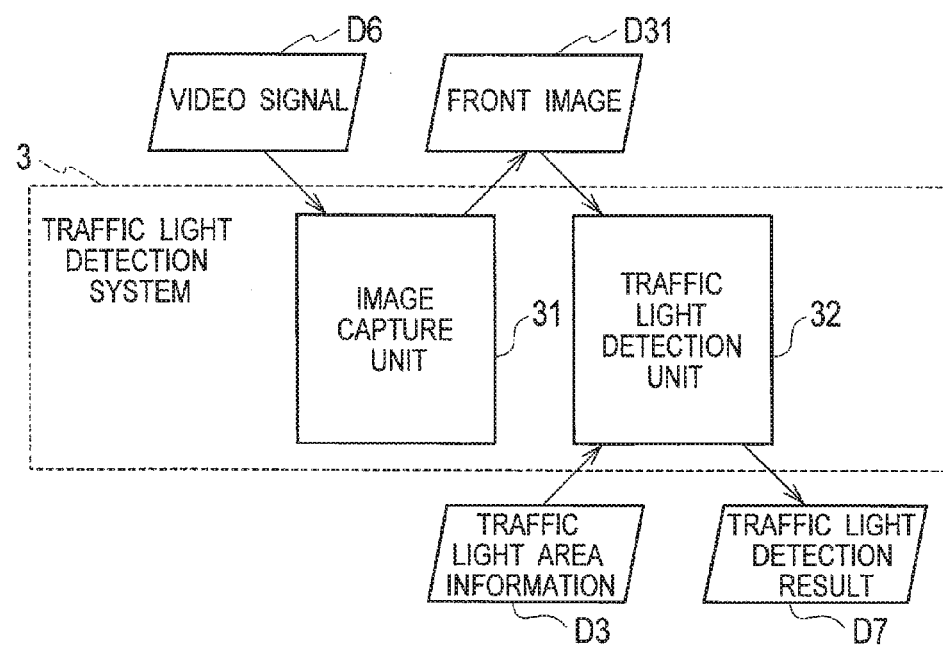

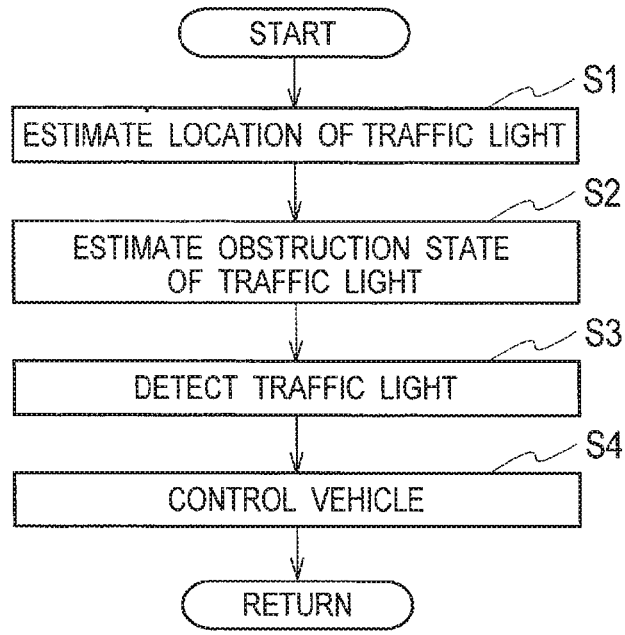
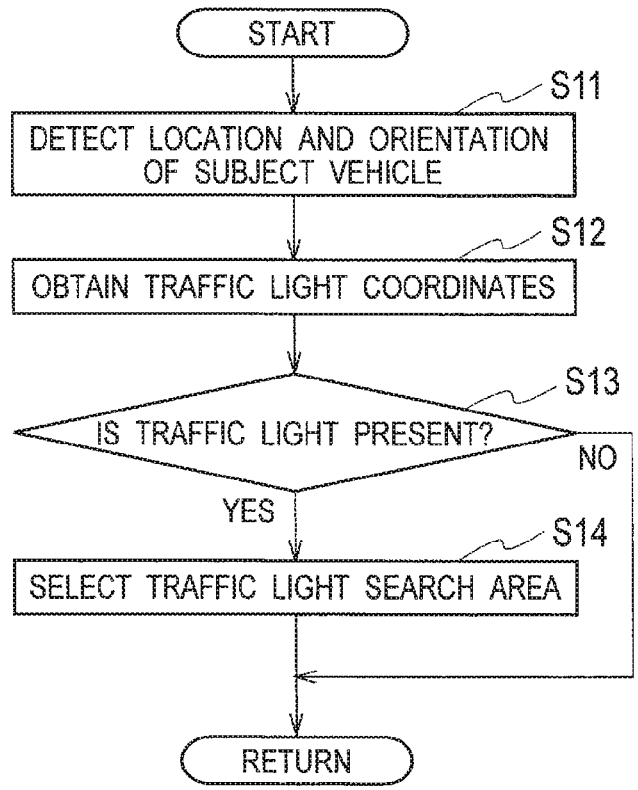

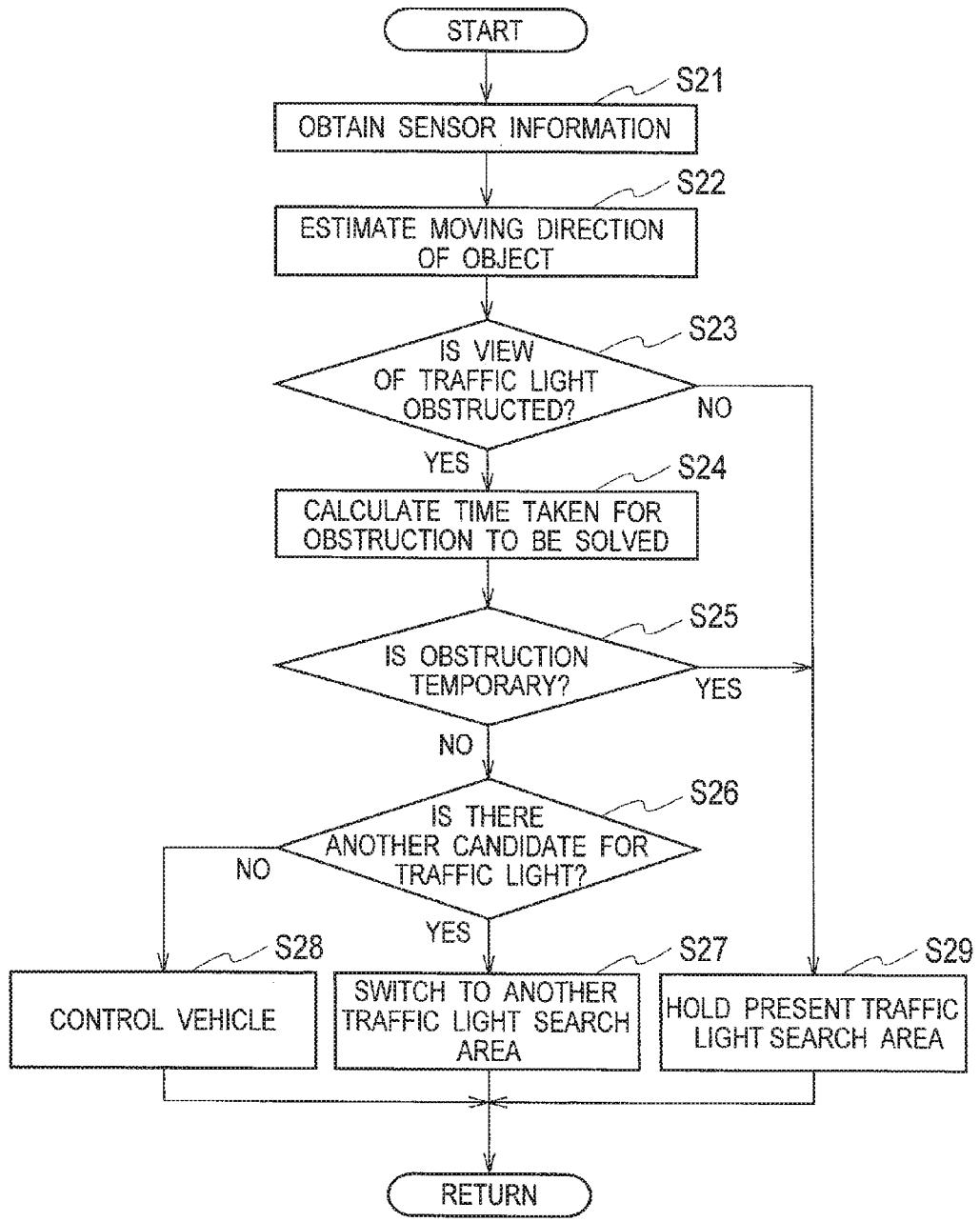

TIME

FIG. 14A DISTANCE TO STOP POSITION 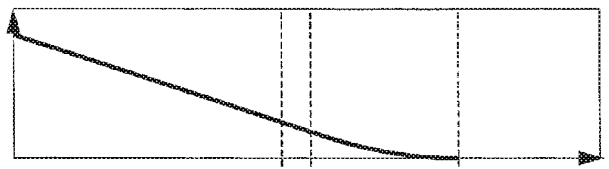
FIG. 14B VEHICLE SPEED 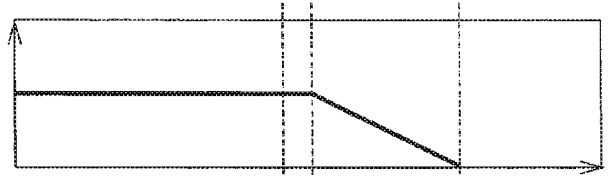
FIG. 14C OBJECT (OBSTRUCTION OBJECT) LOCATION
TRAFFIC LIGHT SEARCH AREA A21
TRAFFIC LIGHT SEARCH AREA A22
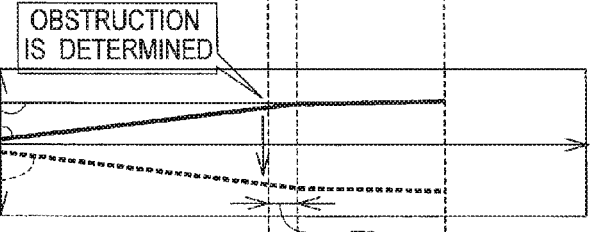
FIG. 14D RELATIVE LOCATION A21
RELATIVE LOCATION A22
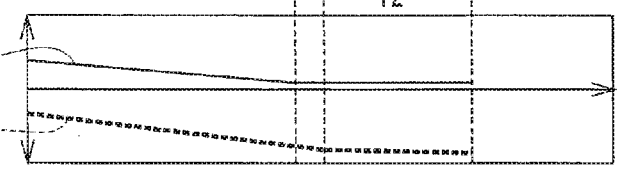
TIME

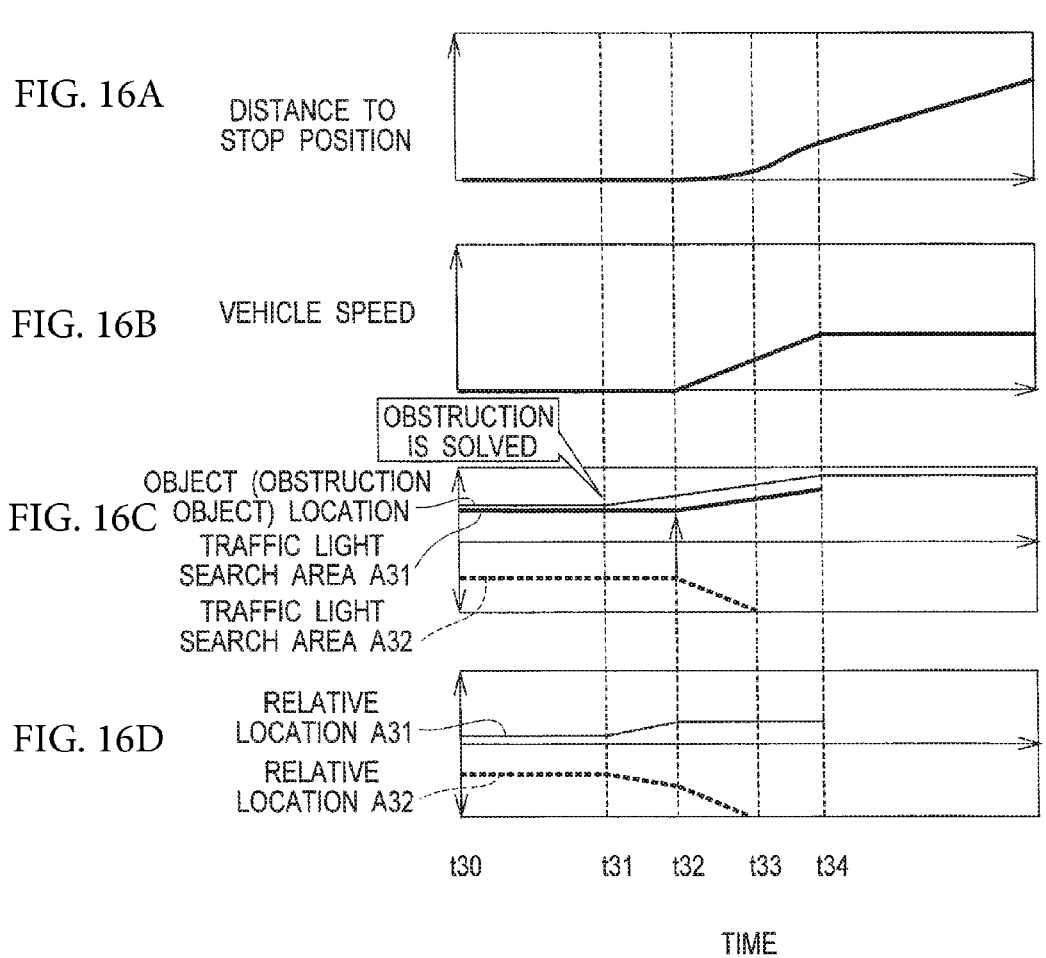

FIG. 18A   DISTANCE TO STOP POSITION
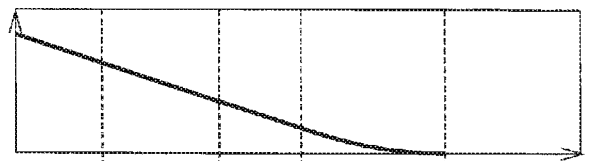
FIG. 18B   VEHICLE SPEED
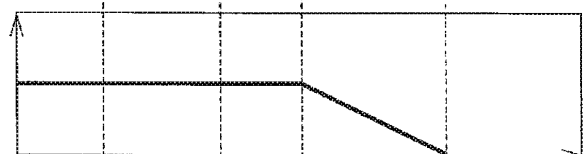
FIG. 18C   OBJECT (OBSTRUCTION OBJECT) LOCATION
TRAFFIC LIGHT SEARCH AREA A41
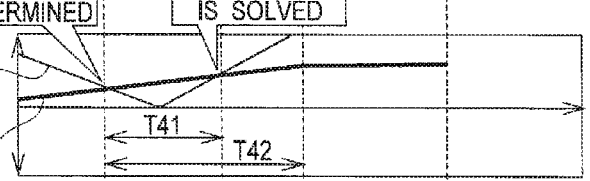
FIG. 18D   RELATIVE LOCATION A41
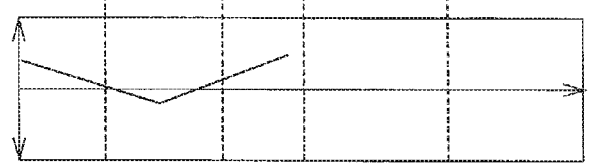
TIME

TRAFFIC LIGHT DETECTION DEVICE AND TRAFFIC LIGHT DETECTION METHOD

TECHNICAL FIELD

The present invention relates to a traffic light detection device and a traffic light detection method.

BACKGROUND

Conventionally, as for a technique of detecting a traffic light ahead of a vehicle when multiple traffic lights are ahead of the vehicle, a technique of detecting a traffic light with the largest size on image data has been known (for example, see Japanese Patent Application Publication No. 2007-257299).

However, in the technique described in Japanese Patent Application Publication No. 2007-257299), when the view of the largest traffic light is obstructed by an object such as a vehicle ahead, a detection target is forced to be switched to the next-largest traffic light even if the obstruction is temporary. This makes it difficult to properly select a traffic light for a detection target in some cases.

SUMMARY

The present invention has been made in view of the above problem, and an object of the present invention is to provide a traffic light detection device and a traffic light detection method capable of properly selecting a traffic light for a detection target based on a continuous obstruction state of the traffic light.

A traffic light detection device and a traffic light detection method according to an aspect of the present invention capture an image of surroundings by an image capture unit mounted on a vehicle; estimate a location of a traffic light around the vehicle with reference to a location of the vehicle and map information; set a traffic light search area in which the traffic light is estimated to be present; detect the traffic light by searching the traffic light search area on the image; estimate whether a continuous obstruction state where a view of the traffic light is continuously obstructed occurs in the traffic light search area; and select the traffic light search area based on the continuous obstruction state when the continuous obstruction state is estimated to occur.

BRIEF DESCRIPTION OF THE DRAWINGS

FIG. 2 is a block diagram that shows an example of a configuration of a location estimation system according to the embodiment of the present invention;

FIG. 3 is a block diagram that shows an example of a configuration of an obstruction estimation system according to the embodiment of the present invention;

FIG. 4 is a block diagram that shows an example of a configuration of a traffic light detection system according to the embodiment of the present invention;

FIG. 6 is a flowchart that shows an example of a traffic light detection method according to the embodiment of the present invention;

FIG. 7 is a flowchart that shows an example of a traffic light location estimation process according to the embodiment of the present invention;

FIG. 8 is a flowchart that shows an example of an obstruction estimation process according to the embodiment of the present invention;

FIG. 14(a) is a timing chart that shows a temporal change of a distance to a stop position according to the second example of the present invention;

FIG. 14(b) is a timing chart that shows a temporal change of a vehicle speed according to the second example of the present invention;

FIG. 14(c) is a timing chart that shows temporal changes of a location of an object and locations of traffic light search areas according to the second example of the present invention;

FIG. 14(d) is a timing chart that shows temporal changes of relative locations of the traffic light search areas with respect to the location of the object according to the second example of the present invention;

FIG. 16(a) is a timing chart that shows a temporal change of a distance to a stop position according to the third example of the present invention;

FIG. 16(b) is a timing chart that shows a temporal change of a vehicle speed according to the third example of the present invention;

FIG. 16(c) is a timing chart that shows temporal changes of a location of an object and locations of traffic light search areas according to the third example of the present invention;

FIG. 16(d) is a timing chart that shows temporal changes of relative locations of the traffic light search areas with respect to the location of the object according to the third example of the present invention;

FIG. 18(*a*) is a timing chart that shows a temporal change of a distance to a stop position according to the fourth example of the present invention;

FIG. 18(*b*) is a timing chart that shows a temporal change of a vehicle speed according to the fourth example of the present invention;

FIG. 18(*c*) is a timing chart that shows temporal changes of a location of an object and a location of a traffic light search area according to the fourth example of the present invention; and FIG. 18(*d*) is a timing chart that shows temporal changes of a relative location of the traffic light search area with respect to the location of the object according to the fourth example of the present invention.

DETAILED DESCRIPTION OF THE EMBODIMENTS

Figure 1:
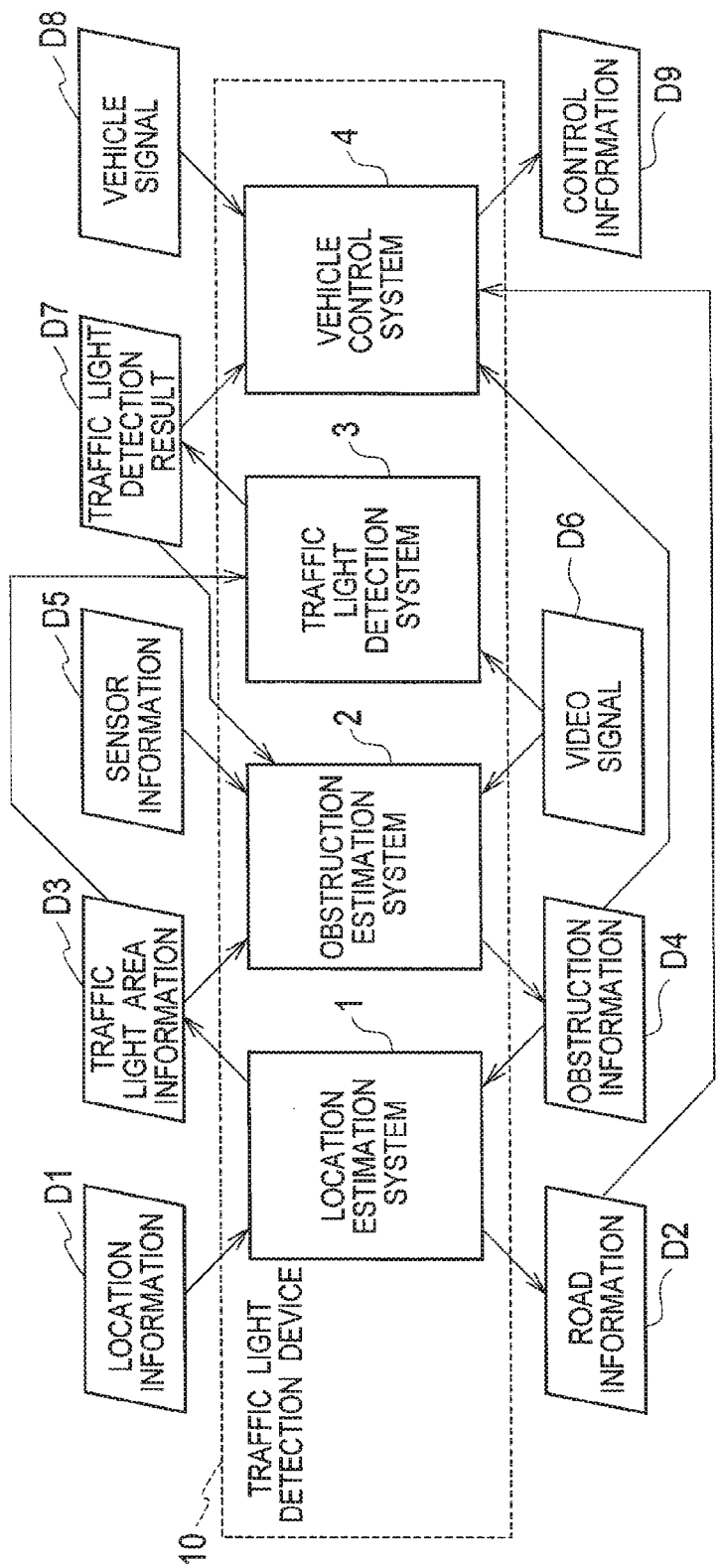
FIG. 1 is a block diagram that shows an example of a configuration of a traffic light detection device according to an embodiment of the present invention.

An embodiment of the present invention is described with reference to the drawings. The same parts are denoted by the same reference signs in the drawings, and descriptions thereof are omitted.

[Traffic Light Detection Device]

A traffic light detection device 10 according to the embodiment of the present invention may be applied to a vehicle capable of automated driving. As shown in FIG. 1, the traffic light detection device 10 according to the embodiment of the present invention includes a location estimation system 1, an obstruction estimation system 2, a traffic light detection system 3, and a vehicle control system 4.

The location estimation system 1, the obstruction estimation system 2, the traffic light detection system 3, and the vehicle control system 4 can be implemented using a micro controller and the like, which mainly includes a central processing unit (CPU), a memory, and an input/output unit. The CPU functions as the multiple information process units 1 to 4 by executing a computer program installed in advance. Note that the micro controller may be used also for an electronic control unit (ECU) used for an automated driving control of a vehicle.

Location information D1, which includes a location of a host vehicle obtained from the Global Positioning System (GPS) and from the number of revolutions of a wheel, and obstruction information D4, which includes an obstruction state of a traffic light resulting from an object (obstructing object), are inputted to the location estimation system 1. An object that obstructs the view of a traffic light is not specially limited and may be a vehicle ahead, an oncoming vehicle, a street tree, a signboard, and a road sign, for example. The location estimation system 1 estimates a location of a traffic light at an intersection to which the host vehicle is coming close. The location estimation system 1 outputs road information D2, which includes a distance from the location of the host vehicle to the intersection to which the host vehicle is coming close, and traffic light area information D3, which relates to the estimated location of the traffic light.

The traffic light area information D3, which is outputted from the location estimation system 1; sensor information D5, which is obtained from various sensors mounted on the host vehicle such as a laser, a millimeter-wave laser, and a stereo camera; a video signal D6, which is obtained from an image capture unit and the like mounted on the host vehicle; and a traffic light detection result D7, which is outputted from the traffic light detection system 3, are inputted to the obstruction estimation system 2. The sensor information D5 includes a distance to the object around the host vehicle. The video signal D6 includes regulatory information such as a white line and a yellow line marked on the road. The obstruction estimation system 2 estimates the obstruction state of the traffic light at the intersection to which the host vehicle is coming close and outputs the estimation result as obstruction information D4.

The traffic light area information D3, which is outputted from the location estimation system 1, and the video signal D6, which is obtained from the image capture unit and the like mounted on the host vehicle, are inputted to the traffic light detection system 3. The traffic light detection system 3 detects the traffic light from an image of surroundings and outputs the traffic light detection result D7.

The road information D2, which is outputted from the location estimation system 1, the obstruction information D4, which is outputted from the obstruction estimation system 2, the traffic light detection result D7, which is outputted from the traffic light detection system 3, and a vehicle signal D8, which includes a vehicle speed obtained from the various sensors and the like mounted on the host vehicle, are inputted to the vehicle control system 4. The vehicle control system 4 decides a method of coming close to the intersection (vehicle control method) such as following a vehicle ahead, deceleration to stop, and acceleration, and outputs the method as control information D9 for vehicle control.

To be more specific, as shown in FIG. 2, the location estimation system 1 includes a vehicle location detection unit 11, a map information unit (map database) 12, and a traffic light location estimation unit 13. The vehicle location detection unit 11 detects a relative location and orientation of the host vehicle with respect to a road on the map based on the location information D1, which includes the location of the host vehicle obtained from the GPS and the number of revolutions of the wheel, and the road information D2, which is obtained from the map information stored in the map information unit 12, and outputs the thus-detected information as a vehicle location D11.

The map information unit 12 stores the map information including the road information D2 in the memory in advance. Based on the vehicle location D11, which is outputted from the vehicle location detection unit 11, the map information unit 12 extracts from the map information traffic light coordinates D12 of the traffic light at the intersection to which the host vehicle is coming close as well as the road information D2 of a travelling direction of the vehicle.

The traffic light location estimation unit 13 estimates relative location of the traffic light with respect to the host vehicle based on the traffic light coordinates D12, which are obtained from the map information unit 12. Then, based on the relative location of the traffic light, the traffic light location estimation unit 13 sets an area, in which it is highly probable that the traffic light is present, as a traffic light search area. The traffic light search area can be set appropriately within a prescribed range depending on detection accuracy and the like of the vehicle location D11.

When multiple traffic lights are at the intersection to which the host vehicle is coming close, the traffic light location estimation unit 13 sets a traffic light search area to each of the multiple traffic lights. In addition, depending on a prescribed priority order, the traffic light location estimation unit 13 selects one or more traffic light search areas from the multiple traffic light search areas and sets the thus-selected traffic light search areas as detection target areas of a traffic light. Note that the detection target areas of a traffic light may not be selected by narrowing the multiple traffic light search areas depending on the prescribed priority order, and a traffic light may be tried to be detected once from all of the multiple traffic light search areas. Traffic light search areas in which a traffic light is detected may be then narrowed and selected as the detection target areas of a traffic light.

For an example of the prescribed priority order, a traffic light on an oncoming vehicle lane side is set to having a priority over a traffic light on a host vehicle lane side. The view of the traffic light on the host vehicle lane side is likely to be obstructed continuously by a vehicle ahead, a street tree on a road shoulder, and the like. On the other hand, the view of the traffic light on the oncoming vehicle lane side is likely to be obstructed temporarily for only short time by an oncoming vehicle. Hence, a detection probability of a traffic light can be enhanced by setting the traffic light on the oncoming vehicle lane side to having a priority.

In addition, as for the prescribed priority order when multiple traffic lights are at the same lane side, a traffic light closer to the host vehicle is set to having a priority over a traffic light farther from the host vehicle. Since the traffic light closer to the host vehicle is shown up on an image with a larger size, this makes it easy to detect the traffic light.

Moreover, during the control of following a vehicle ahead, a traffic light search area of the traffic light on the oncoming vehicle lane side is selected and set preferentially as the detection target area of a traffic light. During the control of following a vehicle ahead, the view of the traffic light on the host vehicle lane side is obstructed continuously by a vehicle ahead. Hence, a detection efficiency of a traffic light can be enhanced by selecting the traffic light search area of the traffic light on the oncoming vehicle lane side. The prescribed priority order can be set appropriately to something different from the above. The prescribed priority order may be stored in the memory in advance.

Further, the traffic light location estimation unit 13 selects a traffic light search area based on the obstruction information D4, which is outputted from the obstruction estimation system 2. For example, when the view of a traffic light search area of a traffic light set presently is not obstructed or it is obstructed but the obstruction is estimated to be temporary and be solved, the traffic light location estimation unit 13 makes a choice of holding the traffic light search area set presently. On the other hand, when the view of the traffic light search area of the traffic light set presently is obstructed presently or it is not obstructed but is estimated to be obstructed in the future, and when the obstruction is estimated to be continuous, the traffic light location estimation unit 13 makes a choice of switching the detection target area of traffic light from the traffic light search area of the traffic light set presently to a traffic light search area of another traffic light. In other words, the traffic light location estimation unit 13 makes a choice of removing the traffic light search area set presently from the detection target area of a traffic light and makes a choice of setting the traffic light search area of the other traffic light as a new detection target area of a traffic light. The traffic light location estimation unit 13 outputs the traffic light area information D3, which includes the traffic light search area selected as the detection target area of a traffic light. Note that in the case where multiple traffic light search areas are set presently, when part of the views of the traffic light search areas are obstructed presently or they are estimated to be obstructed in the future, and when the obstruction is estimated to be continuous, the traffic light location estimation unit 13 may make a choice of removing the traffic light search area, the view of which is estimated to be obstructed continuously, from the detection target area of a traffic light, and the traffic light location estimation unit 13 may make a choice of holding the other traffic light search areas as the detection target areas of traffic lights.

As shown in FIG. 3, the obstruction estimation system 2 includes an object detection unit 21 and an obstruction estimation unit 22. The object detection unit 21 detects objects around the vehicle based on the sensor information D5, which includes a distance to each object around the vehicle, and the video signal D6, which includes the regulatory information such as a white line and a yellow line around the vehicle. A vehicle ahead, an oncoming vehicle, a street tree, a signboard, a road sign, and the like are assumed to be objects to be detected, for example. Then, with regard to the detected objects, the object detection unit 21 calculates a relative location, a traveling direction, and a traveling speed of each of the objects with respect to the host vehicle and outputs the thus-calculated information as an object location D21.

The obstruction estimation unit 22 determines whether or not the view of the traffic light search area is obstructed presently by an object when seeing from the host vehicle with reference to a locational relation between the traffic light search area and the object based on the object location D21, which is outputted from the object detection unit 21, and the traffic light area information D3, which is outputted from the traffic light location estimation unit 13. At this time, the obstruction estimation unit 22 may determine that the view of the traffic light search area is obstructed when the view of the traffic light search area is completely obstructed by the object. Alternatively, the obstruction estimation unit 22 may determine that the view of the traffic light search area is obstructed also when the view of the traffic light search area is partly obstructed by the object. Or alternatively, the obstruction estimation unit 22 may determine that the view of the traffic light search area is obstructed when the traffic light detection result D7, which is outputted from the traffic light detection system 3, indicates a failure in detecting the traffic light.

Further, the obstruction estimation unit 22 determines (estimates) whether or not the view of the traffic light search area is going to be obstructed in the future by the object with reference to relative locations, traveling directions, and traveling speeds of the host vehicle, the traffic light search area, and the object based on the object location D21, which is outputted from the object detection unit 21, and the traffic light area information D3, which is outputted from the traffic light location estimation unit 13.

When the view of the traffic light search area is determined to be obstructed presently or going to be obstructed in the future, the obstruction estimation unit 22 further determines whether the obstruction is continuous or temporary. As continuous obstructions, there are assumed to be, for example, a state where the view of the traffic light on the host vehicle lane side remains obstructed by a street tree or a case where there is a vehicle ahead, and the view of the traffic light on the host vehicle lane side is obstructed every time an inter-vehicle distance to the vehicle ahead gets short, for example. As a temporary obstruction, there is assumed to be a case where an oncoming vehicle obstructs temporarily the view of the traffic light on the oncoming vehicle lane side but the obstruction is solved when the oncoming vehicle and the host vehicle pass each other.

For an example of a method of determining whether the obstruction is continuous or temporary, the obstruction estimation unit 22 calculates obstruction time (in other words, time taken for the obstruction to be solved) of the traffic light search area with reference to the relative locations, the traveling directions, the traveling speeds, and the like of the host vehicle, the object, and the traffic light search area. Then, the obstruction estimation unit 22 determines that the obstruction is temporary when the calculated obstruction time is equal to or shorter than a prescribed time (threshold). On the other hand, the obstruction estimation unit 22 determines that the obstruction is continuous when the calculated obstruction time is longer than the prescribed time (threshold). The threshold to compare to the obstruction time can be set appropriately by the obstruction estimation unit 22 and the like. The threshold is set to time within which the vehicle can decelerate and stop at a stop position of the intersection if the obstruction time is equal to or shorter than the threshold, for example. The threshold in this case can be set by calculating a location of the host vehicle; a distance to the stop position of the intersection; a vehicle speed of the host vehicle; and the time when the subject vehicle needs to start deceleration control, from an allowed deceleration speed, for example. Note that at least when the object and the traffic light search area travel in the same direction, the obstruction estimation unit 22 may determine that the obstruction is continuous.

As shown in FIG. 4, the traffic light detection system 3 includes an image capture unit 31 and a traffic light detection unit 32. The image capture unit 31 is, for example, a digital camera such as a CCD camera or a CMOS camera that captures an image of scenery around the vehicle and obtains the image of the surroundings. An angle of view of the image capture unit 31 may either be fixed or be adjustable as necessary in a vertical direction and a horizontal direction based on the video signal D6 and the like.

The traffic light detection unit 32 associates an image D31, which is captured by the image capture unit 31, with the traffic light area information D3, which is outputted from the traffic light location estimation unit 13, and sets the traffic light search area on the image D31. Then, the traffic light detection unit 32 detects a traffic light by searching the traffic light search area on the image D31. As an example of a method of detecting a traffic light, synchronized detection process based on an alternating cycle of a commercial power source, similarity determination process of a hue and a shape, and other publicly known algorithms can be employed. When the traffic light detection unit 32 succeeds in detecting a traffic light, the traffic light detection unit 32 outputs the traffic light detection result D7 which includes color information of the light of the traffic light. When the traffic light detection unit 32 fails to detect a traffic light, the traffic light detection unit 32 outputs the traffic light detection result D7 which includes that no traffic light is detected.

Figure 5:
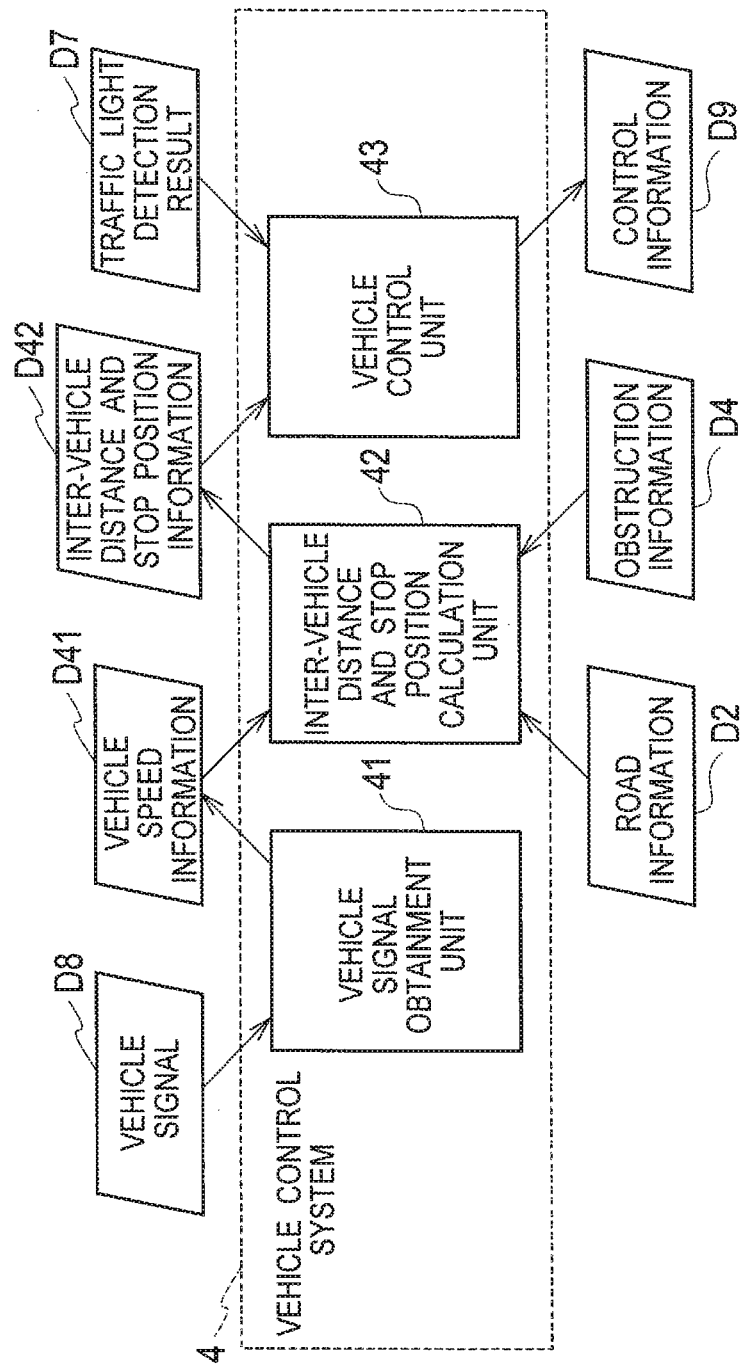
FIG. 5 is a block diagram that shows an example of a configuration of a vehicle control system according to the embodiment of the present invention.
Figure 9:
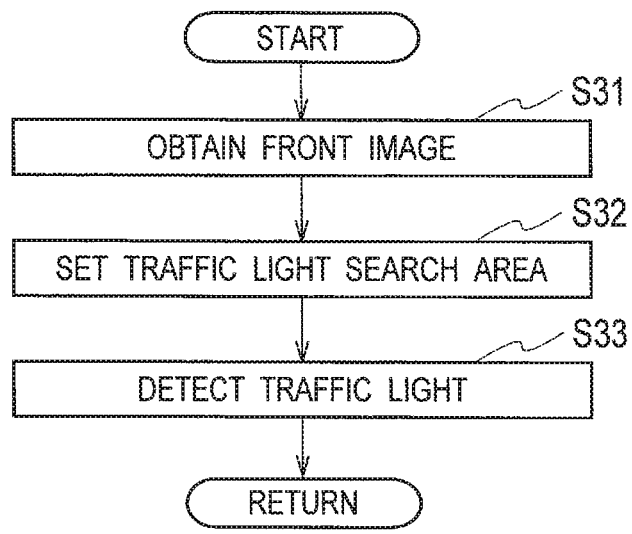
FIG. 9 is a flowchart that shows an example of a traffic light detection process according to the embodiment of the present invention.
Figure 10:
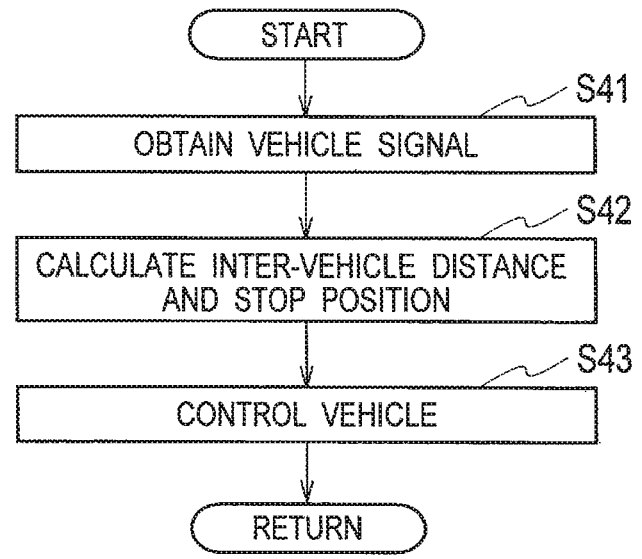
FIG. 10 is a flowchart that shows an example of a vehicle control process according to the embodiment of the present invention.

As shown in FIG. 5, the vehicle control system 4 includes a vehicle signal obtainment unit 41, inter-vehicle distance and stop position calculation unit 42, and a vehicle control unit 43. The vehicle signal obtainment unit 41 obtains a vehicle signal D8 and extracts vehicle speed information D41, which includes a vehicle speed of the host vehicle from the vehicle signal D8.

When the obstruction information D4, which is outputted from the obstruction estimation unit 22, indicates that a vehicle ahead is obstructing the view of the traffic light search area, the inter-vehicle distance and stop position calculation unit 42 calculates an inter-vehicle distance between the vehicle ahead and the host vehicle based on the vehicle speed information D41 and the like. Note that the inter-vehicle distance and stop position calculation unit 42 calculates time left for a collision of the host vehicle with the vehicle ahead or anything that may be an obstacle on the course.

When a position at which a vehicle needs to stop (stop position) such as a stop line is on the next intersection, the inter-vehicle distance and stop position calculation unit 42 calculates a distance from the location of the host vehicle to the stop position based on the road information D2, which is outputted from the map information unit 12. The calculation result of the inter-vehicle distance and stop position calculation unit 42 is outputted as inter-vehicle distance and stop position information D42.

The vehicle control unit 43 selects a vehicle control method for coming close to the intersection based on the traffic light detection result D7, which is outputted from the traffic light detection unit 32, and the inter-vehicle distance and stop position information D42, which is outputted from the inter-vehicle distance and stop position calculation unit 42, and then outputs the thus-selected method as the control information D9.

For example, even when the obstruction information D4 indicates that the view of the traffic light is obstructed continuously by a vehicle ahead, the vehicle control unit 43 makes a choice of following the vehicle ahead if it is determined based on the inter-vehicle distance and stop position information D42 that the host vehicle can stop before the stop line while decelerating at a normal deceleration speed. In addition, the vehicle control unit 43 makes a choice of decelerating when the obstruction information D4 indicates that the view of the traffic light is obstructed continuously by the vehicle ahead and it is determined based on the inter-vehicle distance and stop position information D42 that the host vehicle cannot stop before the stop line while decelerating at the normal deceleration speed.

Moreover, the vehicle control unit 43 makes a choice of holding the present vehicle speed when the obstruction information D4 indicates that the view of the traffic light is not obstructed and the color of the light of the traffic light, which is included in the traffic light detection result D7, is blue. Furthermore, the vehicle control unit 43 makes a choice of decelerating when the obstruction information D4 indicates that the view of the traffic light is not obstructed, the color of the light of the traffic light, which is included in the traffic light detection result D7, is red, and the host vehicle stops at the stop position by decelerating from the present vehicle speed at the normal deceleration speed. Besides, the vehicle control unit 43 makes a choice of accelerating for recovering the speed to reach the speed limit when the obstruction information D4 indicates that the view of the traffic light is not obstructed and the color of the light of the traffic light, which is included in the traffic light detection result D7, changes from red to blue during the deceleration.

In addition, when the obstruction information D4 indicates that the view of the traffic light is obstructed, the vehicle control unit 43 may perform control such that the vehicle has a locational relation in which the obstruction of the traffic light is solved (steering, or acceleration and deceleration, for example) based on relative locational relations between the host vehicle, the object, and the traffic light. For example, when the view of the traffic light on the host vehicle lane side is obstructed by a vehicle ahead, decelerating to make a longer inter-vehicle distance to the vehicle ahead makes it easy to detect the traffic light. Steering control to move to either right or left side within the lane also makes it easy to detect the traffic light.

[Traffic Light Detection Method]

Next, an example of a traffic light detection method according to the embodiment of the present invention is described with reference to the flowcharts in FIGS. 6 to 10.

A set of process of the traffic light detection method according to the embodiment of the present invention can be executed repeatedly at prescribed intervals.

FIG. 6 shows overall procedures of process of the traffic light detection method. In step S1 in FIG. 6, the location estimation system 1 mainly estimates the location of the traffic light at the intersection to which the vehicle is coming close. Details of this step are shown in the flowchart in FIG. 7. In step S11, the vehicle location detection unit 11 detects a location and an orientation of the host vehicle based on the location information D1 and the road information D2 and outputs the thus-detected information as the vehicle location D11. In step S12, based on the vehicle location D11, the map information unit 12 outputs the traffic light coordinates D12, which is set to the traffic light at the intersection to which the vehicle is coming close.

In step S13, with reference to the vehicle location D11 and the traffic light coordinates D12, the traffic light location estimation unit 13 determines whether or not a traffic light is present at the intersection to which the vehicle is coming close. When the traffic light location estimation unit 13 determines that there is no traffic light, the process is completed. On the other hand, when the traffic light location estimation unit 13 determines that there is a traffic light, the process proceeds to step S14. In step S14, the traffic light location estimation unit 13 estimates the relative location of the traffic light with respect to the host vehicle with reference to the vehicle location D11 and the traffic light coordinates D12. Then, the traffic light location estimation unit 13 sets an area, which is estimated that the traffic light is likely to be there, as a traffic light search area. Furthermore, when there are multiple traffic light search areas, the traffic light location estimation unit 13 selects one or more traffic light search areas from the multiple traffic light search areas and sets the thus-selected traffic light search areas as detection target areas of traffic lights depending on a prescribed priority order.

Referring back to FIG. 6, in step S2, the obstruction estimation system 2 mainly estimates the obstruction state of the traffic light caused by an object. Details of this step are shown in the flowchart in FIG. 8. In step S21, the object detection unit 21 detects objects around the vehicle based on the sensor information D5, which includes a distance to the object around the vehicle, the video signal D6, and the like. Then, with regard to the detected objects, the object detection unit 21 calculates a relative location, a traveling direction, and a traveling speed of each of the objects with respect to the host vehicle.

In step S23, based on the locational relation between the traffic light search area and the object, the obstruction estimation unit 22 determines whether or not the view of the traffic light search area is obstructed by the object. Further, the obstruction estimation unit 22 determines whether or not the view of the traffic light is going to be obstructed by the object based on locations, traveling directions, and traveling speeds of the traffic light search area and the object. When the view of the traffic light is determined to be not obstructed at present and in the future, the process proceeds to step S29, and the traffic light location estimation unit 13 holds, without switching, the traffic light search area set presently. On the other hand, in step S23, when the view of the traffic light is determined to be obstructed presently or is going to be obstructed, the process proceeds to step S24.

In step S24, the obstruction estimation unit 22 calculates the time taken for the obstruction of the traffic light search area to be solved (the obstruction time), based on the relative locations, the traveling directions, and the traveling speeds of the traffic light search area and the object. In step S25, the obstruction estimation unit 22 reads the threshold from the memory and determines whether the obstruction time is equal to or longer than the threshold. When the obstruction time is equal to or shorter than the threshold, the obstruction is determined to be temporary and the process proceeds to step S29. Then, the traffic light location estimation unit 13 holds, without switching, the traffic light search area set presently. On the other hand, when the time taken for solving the obstruction is longer than the threshold, the obstruction is determined to be continuous and the procedure proceeds to step S26.

In step S26, the traffic light location estimation unit 13 determines whether or not there is a candidate for another traffic light other than the traffic light of the traffic light search area set presently. When there is a candidate for the other traffic light, the process proceeds to step S27 and the traffic light location estimation unit 13 switches the detection target of a traffic light to the traffic light search area corresponding to the other traffic light. On the other hand, when there is no candidate for the other traffic light in step S26, the process proceeds to step S28 and the vehicle control is performed to ensure the safety even when the view of the traffic light is obstructed.

Referring back to FIG. 6, in step S3, the traffic light detection system 3 mainly detects the traffic light around the vehicle. Details of this step are shown in a flowchart in FIG. 9. In step S31, the image capture unit 31 obtains the image D31. In step S32, the traffic light detection unit 32 associates the image D31 with the traffic light search area and sets the traffic light search area on the image D31. In step S33, the traffic light detection unit 32 detects the traffic light by searching the traffic light search area on the image D31.

Referring back to FIG. 6, in step S4, the vehicle control system 4 mainly controls the vehicle depending on the obstruction state of the traffic light. Details of this step are shown in the flowchart in FIG. 10. In step S41, the vehicle signal obtainment unit 41 obtains the vehicle signal D8 and extracts the vehicle speed information D41, which is included in the vehicle signal D8. In step S42, the inter-vehicle distance and stop position calculation unit 42 calculates the inter-vehicle distance between the host vehicle and a vehicle ahead and the distance between the location of the host vehicle and the stop position of the intersection based on the vehicle information D2 and the like. In step S43, the vehicle control unit 43 selects the vehicle control method according to the obstruction information D4, the traffic light detection result D7, the inter-vehicle distance and stop position information D42, and the like, and outputs the thus-selected information as the control information D9. The ECU mounted on the vehicle performs the vehicle control based on the control information.

First Example

Next, as a first example of the present invention, a case where the view of a traffic light is obstructed continuously by a street tree or a signboard nearby the traffic light is described with reference to FIGS. 11 and 12.

Figure 11A:
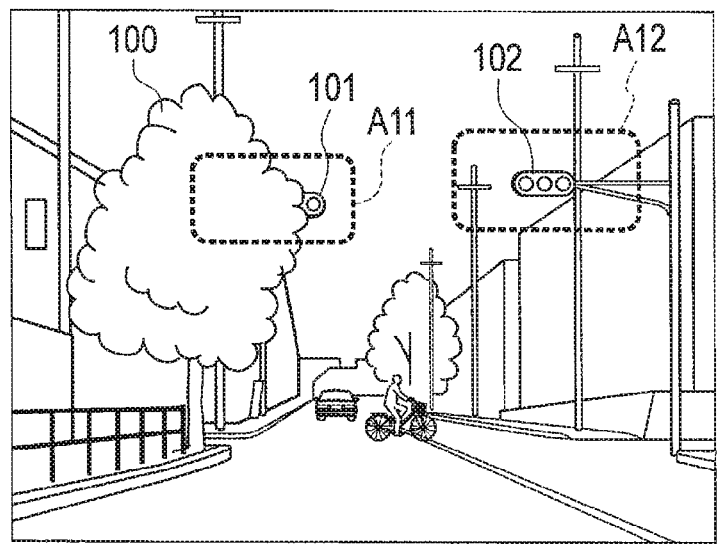
FIG. 11(a) and FIG. 11(b) are each a schematic view that shows an example of a temporal change of a front image according to a first example of the present invention.
Figure 11B:
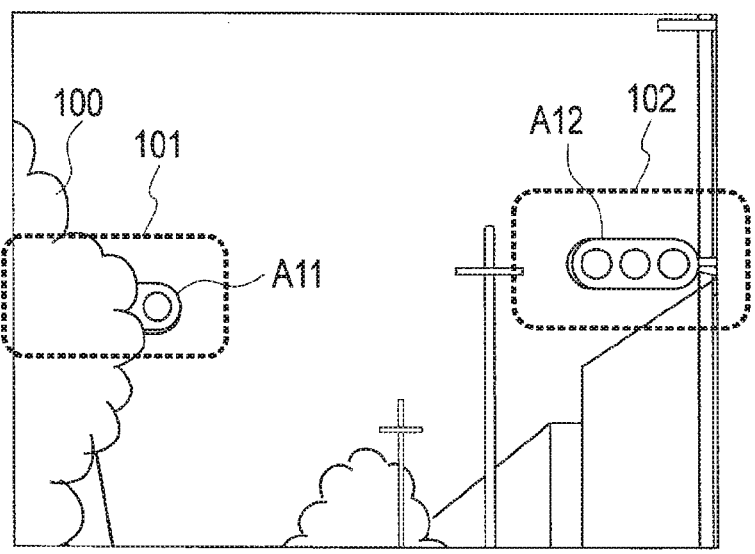

As shown in FIG. 11(a), a traffic light 101 on the host vehicle lane side and a traffic light 102 on the oncoming vehicle lane side are at the intersection ahead of the vehicle. The view of a traffic light search area A11 of the traffic light 101 on the host vehicle lane side is partly obstructed by a street tree 100 on the road shoulder. As shown in FIG. 11(b), although the vehicle has moved forward, the traffic light search area A11 of the traffic light 101 on the host vehicle lane side is still obstructed continuously by the street tree 100. On the other hand, the view of a traffic light search area A12 of the traffic light 102 on the oncoming vehicle lane side is not obstructed and shown up on the image.

Figure 12A:
FIG. 12(a) is a timing chart that shows a temporal change of a distance to a stop position according to the first example of the present invention.
Figure 12B:
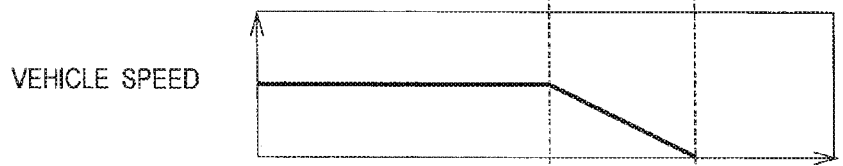
FIG. 12(b) is a timing chart that shows a temporal change of a vehicle speed according to the first example of the present invention.
Figure 12C:
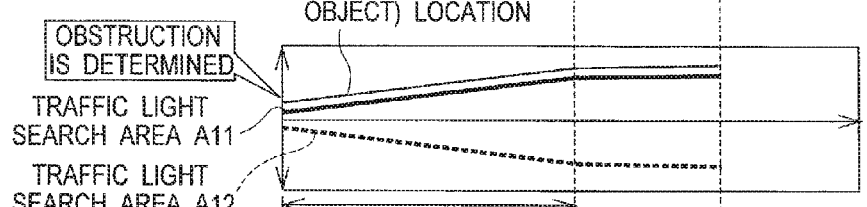
FIG. 12(c) is a timing chart that shows temporal changes of a location of an object and locations of traffic light search areas according to the first example of the present invention.
Figure 12D:
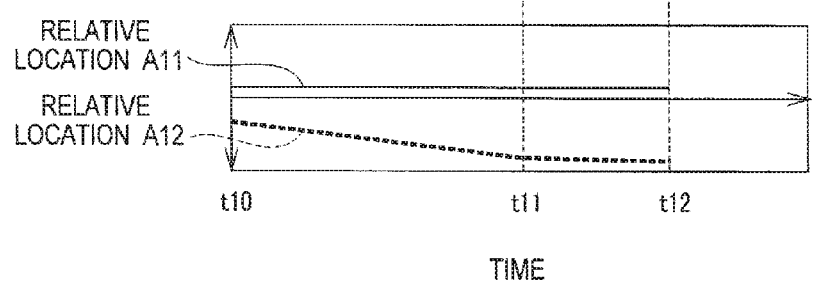
FIG. 12(d) is a timing chart that shows temporal changes of relative locations of the traffic light search areas with respect to the location of the object according to the first example of the present invention.

Given such a situation, FIG. 12(a) shows a temporal change of a distance to the stop position of the vehicle, FIG. 12(b) shows a temporal change of a vehicle speed, FIG. 12(c) shows temporal changes of locations (location of the center of gravity in a vehicle width direction) of the object (street tree) 100 and the traffic light search areas A11 and A12 with respective to the vanishing point in the front image, and FIG. 12(d) shows temporal changes of relative locations (location of the center of gravity in a vehicle width direction) of the traffic light search areas A11 and A12 with respect to the object (street tree) 100.

Assuming that time t10 is the present time point, as shown in FIGS. 12(c) and 12(d), the obstruction estimation unit 22 determines that the locations of the traffic light search area A11 and the street tree 100 are close and that the street tree 100 is obstructing the view of the traffic light search area A11. Further, the obstruction estimation unit 22 estimates that the obstruction is continuous because the traffic light search area A11 and the street tree 100 move in approximately the same direction at approximately the same speed while remaining close to each other after the time t10 and the obstruction time is longer than a prescribed time (threshold) T1.

Hence, when the traffic light search area A11 is selected as the detection target of a traffic light, the traffic light location estimation unit 13 switches the detection target of a traffic light to the traffic light search area A12 corresponding to the other traffic light 102.

The traffic light detection unit 32 detects the traffic light 102 from the traffic light search area A12. When the traffic light detection unit 32 detects that the color of the light of the traffic light 102 is red, the host vehicle starts deceleration at time t11 and stops at the stop position of the intersection at time t12 as shown in FIGS. 12(a) and 12(b).

Second Example

Next, as a second example of the present invention, a case where the view of a traffic light is obstructed continuously by a vehicle ahead is described with reference to FIGS. 13 and 14.

Figure 13A:
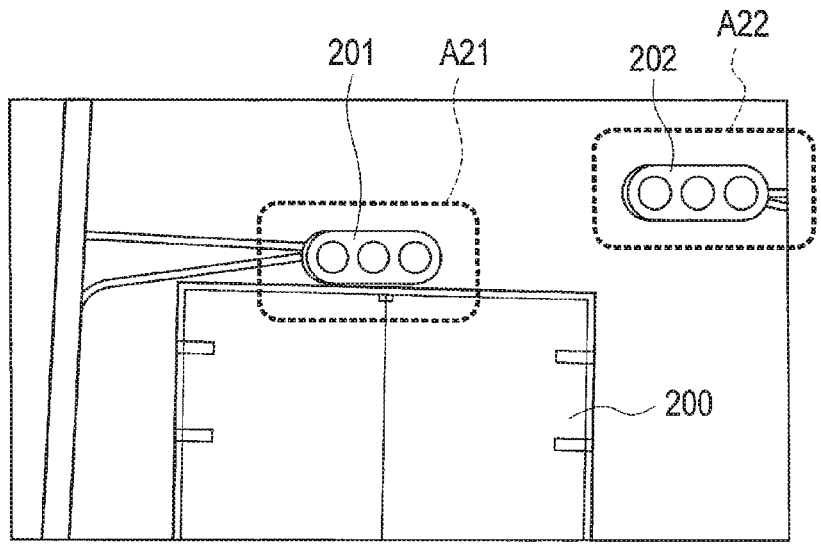
FIG. 13(a) and FIG. 13(b) are each a schematic view that shows an example of a temporal change of a front image according to a second example of the present invention.
Figure 13B:
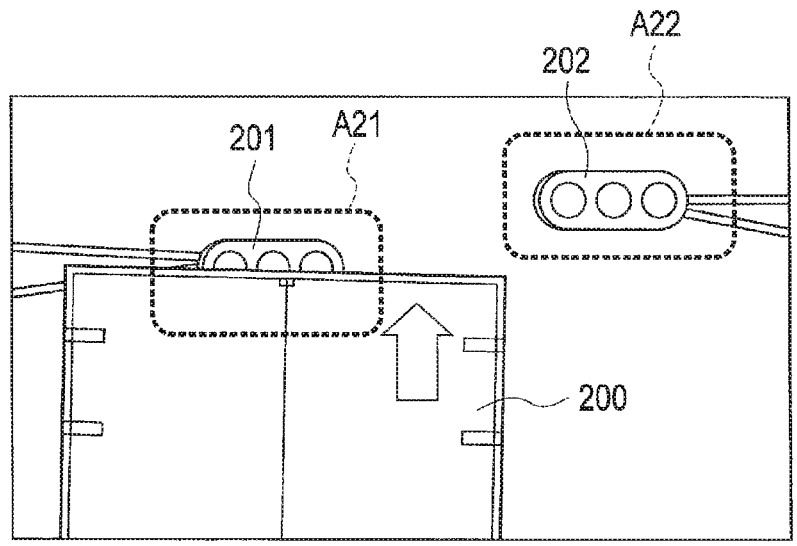

FIG. 13(a) is a state where the host vehicle is following a vehicle ahead 200, and there are a traffic light 201 on the host vehicle lane side and a traffic light 202 on the oncoming vehicle lane side at the intersection ahead of the vehicle. As shown in FIG. 13(b), when the vehicle ahead 200 decelerates or stops for a red light, the inter-vehicle distance between the host vehicle and the vehicle ahead 200 gets shorter, causing more often the situations where the view of the traffic light search area A21 of the traffic light 201 on the host vehicle lane side is obstructed. This may be referred to as the continuous obstruction state.

Given such a situation, FIG. 14(a) shows a temporal change of a distance to the stop position, FIG. 14(b) shows a temporal change of a vehicle speed, FIG. 14(c) shows temporal changes of locations (location of the center of gravity in the vehicle width direction) of the object (vehicle ahead) 200 and the traffic light search areas A21 and A22 with respective to the vanishing point in the front image, and FIG. 14(d) shows temporal changes of relative locations (location of the center of gravity in the vehicle width direction) of the traffic light search areas A21 and A22 with respect to the object (vehicle ahead) 200.

Assuming that time t20 is the present time point, as shown in FIGS. 14(c) and 14(d), the obstruction estimation unit 22 determines that the vehicle ahead 200 is going to obstruct the view of the traffic light search area A21 at future time t21. Further, the obstruction estimation unit 22 estimates that the obstruction is a continuous one caused by the vehicle ahead 200 because the estimated location of the vehicle ahead 200 does not change much and the obstruction time is longer than a prescribed time (threshold) T2.

When the traffic light search area A21 is selected as the detection target of a traffic light, the traffic light location estimation unit 13 switches the detection target of a traffic light to the traffic light search area A22 of the traffic light 202 on the oncoming vehicle lane side. Note that the switching from the traffic light search area A21 to the traffic light search area A22 may be performed either immediately at the time t20 or when the view of the traffic light search area A21 is obstructed at the time t21.

The traffic light detection unit 32 detects the traffic light 202 from the traffic light search area A22 that is selected as the detection target. When the traffic light detection unit 32 detects that the color of the light of the traffic light 202 is red, the host vehicle starts deceleration at time t22 and stops at the stop position of the intersection at time t23 as shown in FIGS. 14(a) and 14(b).

Third Example

Next, as a third example of the present invention, a case where the host vehicle is stopping behind a vehicle ahead at the intersection is described with reference to FIGS. 15 and 16.

Figure 15A:
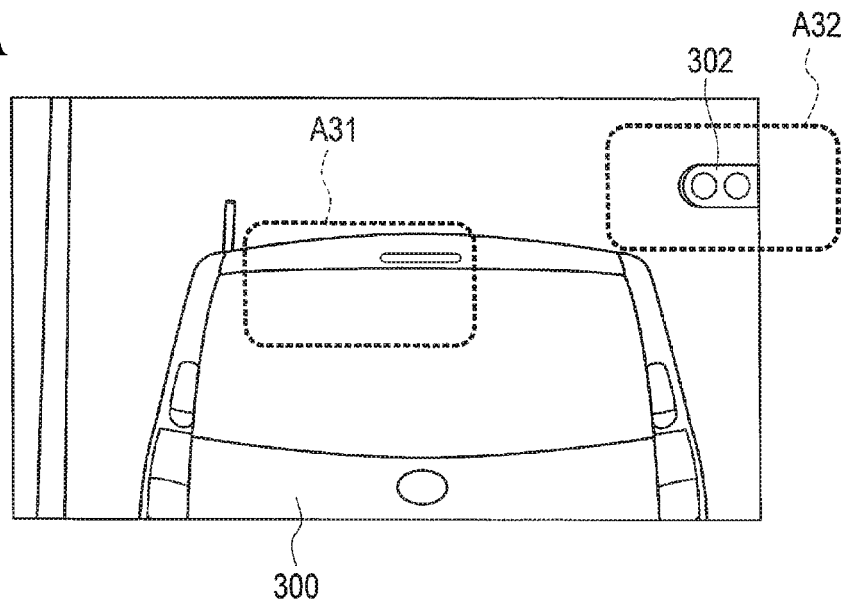
FIG. 15(a) and FIG. 15(b) are each a schematic view that shows an example of a temporal change of a front image according to a third example of the present invention.
Figure 15B:
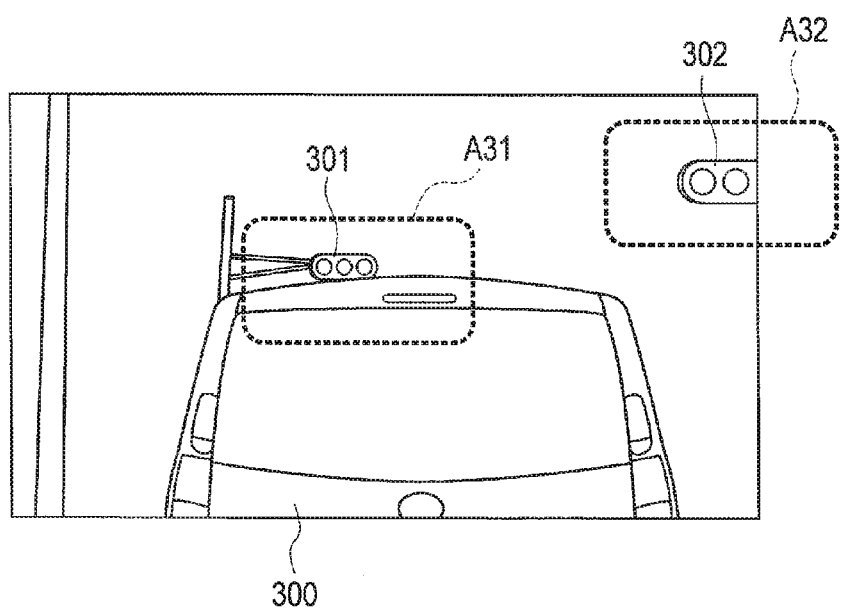

FIG. 15(a) is a state where the host vehicle is stopping with a vehicle ahead 300 at the intersection, and FIG. 15(b) is a state after the vehicle ahead 300 has started. As shown in FIGS. 15(a) and 15(b), there are a traffic light 301 on the host vehicle lane side ahead of the vehicle and a traffic light 302 on the oncoming vehicle lane side.

Given such a situation, FIG. 16(a) shows a temporal change of a distance to the stop position of the vehicle, FIG. 16(b) shows a temporal change of a vehicle speed, FIG. 16(c) shows temporal changes of a location (location of the center of gravity) of the vehicle ahead 300 and locations (location of the center of gravity in the vehicle width direction) of the traffic light search areas A31 and A32 with respect to the vanishing point in the front image, and FIG. 16(d) shows temporal changes of relative locations (location of the center of gravity in the vehicle width direction) of the traffic light search areas A31 and A32 with respect to the vehicle ahead 300.

As shown in FIGS. 16(a) and 16(b), during the time from time t30 to time t31, the host vehicle is inhibited from starting while the host vehicle and the vehicle ahead 300 are stopped. In addition, it is assumed that the traffic light search area A32 is selected as the detection target of a traffic light in advance.

As shown in FIGS. 16(c) and 16(d), at time t31, the obstruction estimation unit 22 determines that the vehicle ahead 300 has started and the obstruction of the view of the traffic light search area A31 has been solved. Thereafter, as shown in FIGS. 16(a) and 16(b), the host vehicle starts at time t32.

As shown in FIGS. 16(c) and 16(d), at time t33, the traffic light search area A32 is out of the angle of view. Hence, at time t32 before time t33, the detection target area of a traffic light is switched and set from the traffic light search area A32 to the traffic light search area A31 the obstruction to which has been solved.

Fourth Example

Next, as a fourth example of the present invention, a case where the view of a traffic light is obstructed temporarily by an oncoming vehicle and the like is described with reference to FIGS. 17 and 18.

Figure 17A:
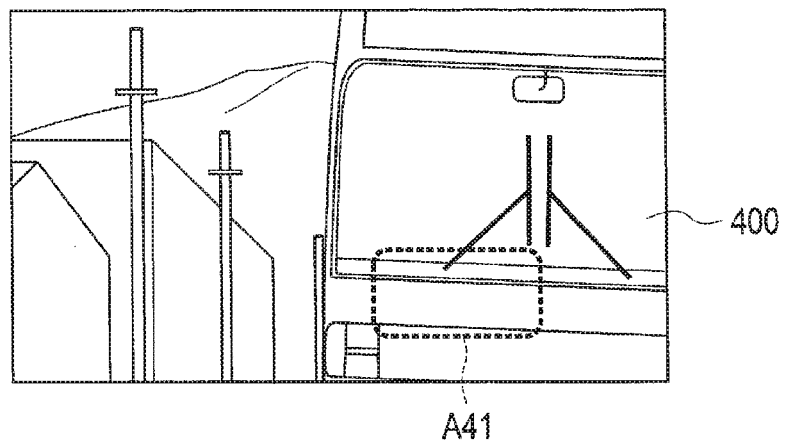
FIG. 17(a) and FIG. 17(b) are each a schematic view that shows an example of a temporal change of a front image according to a fourth example of the present invention.
Figure 17B:
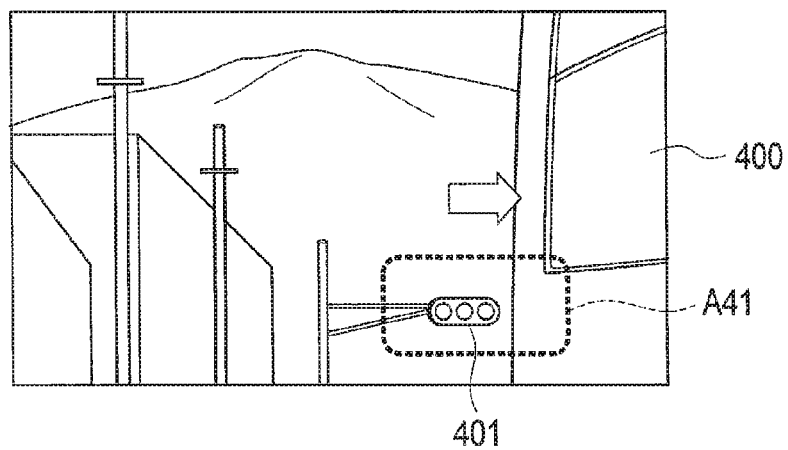

FIG. 17(a) shows a situation where there is an oncoming vehicle 400 that is obstructing the view of a traffic light search area A41, and FIG. 17(b) shows a situation where the host vehicle and the oncoming vehicle 400 move in such a way as to pass each other whereby a traffic light 401 corresponding to the traffic light search area A41 is shown up.

Given such a situation, FIG. 18(a) shows a temporal change of a distance to the stop position of the vehicle, FIG. 18(b) shows a temporal change of a vehicle speed, FIG. 18(c) shows temporal changes of locations (location of the center of gravity in the vehicle width direction) of the object (oncoming vehicle) 400 and the traffic light search area A41 with respect to the vanishing point in the front image, and FIG. 18(d) shows a temporal change of a relative location (location of the center of gravity in the vehicle width direction) of the traffic light search area A41 with respect to the object (oncoming vehicle) 400.

Assuming that time t40 is the present time point, as shown in FIGS. 18(c) and 18(d), the obstruction estimation unit 22 estimates that the oncoming vehicle 400 is going to obstruct the view of the traffic light search area A41 at future time t41.

Further, the obstruction estimation unit 22 calculates an obstruction time T41 with reference to a moving direction and a moving speed of the oncoming vehicle 400 with respect to the traffic light search area A41. Then, the obstruction estimation unit 22 compares the obstruction time T41 with a prescribed time (threshold) T42, which is necessary for decelerating and stopping the vehicle. Since the obstruction time T41 is equal to or shorter than the prescribed time T42, the obstruction is estimated to be temporary.

The traffic light location estimation unit 13 holds the traffic light search area A41 set presently and waits for the obstruction of the view of the traffic light search area A41 to be solved even if there is a candidate for another traffic light in the same intersection. When the obstruction is solved at time t42, the traffic light detection unit 32 searches the traffic light search area A41 and detects the traffic light.

Advantageous Effect of Present Invention

According to the embodiment of the present invention, a traffic light search area for a detection target of a traffic light can be properly selected by estimating the obstruction state of the traffic light caused by an object at present and in the future and by selecting and setting a traffic light search area based on the estimated obstruction state. As a result, the traffic light at the intersection can be detected with high accuracy.

In addition, by estimating obstruction time of a traffic light when the view of the traffic light is obstructed presently or going to be obstructed in the future and by holding the traffic light search area set currently when the estimated obstruction time is equal to or shorter than the threshold, the traffic light can be detected after the temporary obstruction is solved and the traffic light search area is prevented from being switched unnecessarily. As a result, load of the traffic light detection device 10 can be reduced.

Moreover, when multiple traffic lights are present around the vehicle and the estimated obstruction time is longer than the threshold, it is possible to properly select a traffic light search area in which the traffic light can be detected by switching the traffic light search area set currently to the traffic light search area of another traffic light.

Furthermore, out of the multiple traffic lights, the traffic light search area of a traffic light that is detected easier than others can be properly selected by setting the priority order with reference to the locational relations between the vehicle and the multiple traffic lights and selecting a traffic light search area of another traffic light in the priority order.

In addition, during the control of following a vehicle ahead, the detection efficiency of the traffic light can be enhanced by selecting a traffic light search area of a traffic light on the oncoming vehicle lane side.

Moreover, the traffic light can be detected easier by performing control such that the vehicle has a locational relation in which the obstruction of the traffic light is solved, based on relative locational relations between the host vehicle, the object, and the traffic light.

As above, the embodiment of the present invention is described. However, it should not be understood that the statements and drawings that form part of this disclosure limit the invention. From this disclosure, various modifications, examples, and operational techniques will be apparent to those skilled in the art.

REFERENCE SIGNS LIST 1 location estimation system
2 obstruction estimation system
3 traffic light detection system
4 vehicle control system
10 traffic light detection device
11 vehicle location detection unit
12 map information unit
13 traffic light location estimation unit
21 object detection unit
22 obstruction estimation unit
31 image capture unit
32 traffic light detection unit
41 vehicle signal obtainment unit
42 inter-vehicle distance and stop position calculation unit
43 vehicle control unit

The invention claimed is:
1. A traffic light detection device comprising:
a camera that is mounted on a vehicle and captures an image of surroundings;
a vehicle location detection circuit that detects a location of the vehicle;
a memory that stores map information;
a controller configured to:
estimate a location of a traffic light around the vehicle with reference to the location of the vehicle and the map information, and sets a traffic light search area in which the traffic light is estimated to be present;
detect the traffic light by searching the traffic light search area on the image; and
estimate whether a continuous obstruction state where a view of the traffic light is continuously obstructed occurs in the traffic light search area, wherein when the continuous obstruction state is estimated, the traffic light search area is selected based on the continuous obstruction state.

2. The traffic light detection device according to claim 1, wherein
when the view of the traffic light is obstructed presently or going to be obstructed in the future, the controller estimates obstruction time of the traffic light, and
when the obstruction time estimated for the set traffic light search area is equal to or shorter than a threshold, the controller holds the set traffic light search area.

3. The traffic light detection device according to claim 2, wherein when a plurality of traffic lights are present around the vehicle and the estimated obstruction time is longer than the threshold, the controller switches from the set traffic light search area to a traffic light search area of another traffic light.

4. The traffic light detection device according to claim 3, wherein the controller is further configured to set a priority order with reference to locational relations between the vehicle and the plurality of traffic lights, and selects the traffic light search area of the other traffic light in the priority order.

5. The traffic light detection device according to claim 1, wherein during control of following a vehicle ahead, the controller selects a traffic light search area of a traffic light on an oncoming vehicle lane side.

6. The traffic light detection device according to claim 1 configured to control the vehicle such that the vehicle has a locational relation in which the obstruction of the view of the traffic light is solved, based on relative locational relations between the vehicle, an object, and the traffic light.

7. A traffic light detection method comprising the steps of:
capturing an image of surroundings by a camera mounted on a vehicle;
estimating a location of a traffic light around the vehicle with reference to a location of the vehicle and map information;
setting a traffic light search area in which the traffic light is estimated to be present;
detecting the traffic light by searching the traffic light search area on the image;
estimating whether a continuous obstruction state where a view of the traffic light is continuously obstructed occurs in the traffic light search area; and
selecting the traffic light search area based on the continuous obstruction state when the continuous obstruction state is estimated to occur.

* * * * *